United States Patent
Cao (10) Patent No.: US 11,188,913 B2
(45) Date of Patent: Nov. 30, 2021

(54) SYSTEMS AND METHODS FOR SECURELY VERIFYING A SUBSET OF PERSONALLY IDENTIFIABLE INFORMATION

(71) Applicant: Capital One Services, LLC, McLean, VA (US)

(72) Inventor: Qixu Cao, Falls Church, VA (US)

(73) Assignee: Capital One Services, LLC, McLean, VA (US)

(*) Notice: Subject to any disclaimer, the term of this patent is extended or adjusted under 35 U.S.C. 154(b) by 3 days.

(21) Appl. No.: 16/245,561

(22) Filed: Jan. 11, 2019

(65) Prior Publication Data
US 2020/0226600 A1 Jul. 16, 2020

(51) Int. Cl.
- *G06Q 20/40* (2012.01)
- *G06Q 20/32* (2012.01)
- *G06Q 20/38* (2012.01)
- *H04L 9/06* (2006.01)

(52) U.S. Cl.
CPC ..... *G06Q 20/4014* (2013.01); *G06Q 20/3276* (2013.01); *G06Q 20/388* (2013.01); *H04L 9/0637* (2013.01)

(58) Field of Classification Search
None
See application file for complete search history.

(56) References Cited

U.S. PATENT DOCUMENTS

| | | | |
|---|---|---|---|
| 6,938,022 | B1 | 8/2005 | Singhal |
| 7,069,427 | B2 | 6/2006 | Adler et al. |
| 2005/0165684 | A1* | 7/2005 | Jensen ............. G06Q 20/40145 705/44 |

(Continued)

FOREIGN PATENT DOCUMENTS

WO 2018/038914 A1 3/2018

OTHER PUBLICATIONS

T. H. Vo, W. Fuhrmann and K. Fischer-Hellmann, "Privacy-preserving user identity in Identity-as-a-Service," 2018 21st Conference on Innovation in Clouds, Internet and Networksand Workshops (ICIN), 2018, pp. 1-8, doi: 10.1109/ICIN.2018.8401613. (Year: 2018).*

(Continued)

*Primary Examiner* — Patrick McAtee
*Assistant Examiner* — Eduardo Castilho
(74) *Attorney, Agent, or Firm* — Bookoff McAndrews, PLLC (57) ABSTRACT

Disclosed are systems and methods for securely verifying a subset of personally identifiable information (PII) of a first user to a second user is disclosed. A computer-implemented method may include receiving a query request from the second user through a second user application to verify the subset of PII of the first user; prompting the first user, through a first user application, to authenticate the query request; in response to the first user authenticating the query request, processing the query request to identify, in a secured database, the subset of PII of the first user stored in the secured database, to generate an identified subset of PII; comparing the subset of PII to the identified subset of PII to determine if a condition is satisfied; based on the comparing, generating an answer to the query request; and transmitting the answer to the second user through the second user application.

18 Claims, 5 Drawing Sheets

(56) References Cited

U.S. PATENT DOCUMENTS

| | | | | |
|---|---|---|---|---|
| 2014/0297530 A1* | 10/2014 | Eckel | ................. | G06Q 20/4014 705/44 |
| 2015/0058145 A1* | 2/2015 | Luciani | ............... | G06Q 20/204 705/17 |
| 2015/0295906 A1* | 10/2015 | Ufford | .............. | G06Q 20/4014 726/6 |
| 2015/0356316 A1* | 12/2015 | Thompson | .......... | G06F 21/6245 726/28 |
| 2016/0104041 A1* | 4/2016 | Bowers | .................. | G06F 21/41 382/115 |
| 2016/0196554 A1* | 7/2016 | Yin | ..................... | G06Q 20/385 705/71 |
| 2016/0224972 A1* | 8/2016 | Li | ..................... | G06Q 20/3223 |
| 2016/0232416 A1* | 8/2016 | Rossi | ..................... | G16H 10/65 |
| 2017/0118202 A1* | 4/2017 | Mathew | ................ | G06F 21/445 |
| 2017/0140174 A1* | 5/2017 | Lacey | .................... | G06Q 20/02 |
| 2017/0228371 A1* | 8/2017 | Seger, II | ............ | G06F 16/2379 |
| 2017/0286717 A1* | 10/2017 | Khi | ..................... | G06F 21/6245 |
| 2018/0013560 A1* | 1/2018 | He | ......................... | G06Q 50/01 |
| 2018/0060496 A1* | 3/2018 | Bulleit | ................... | G16H 10/60 |
| 2018/0089461 A1* | 3/2018 | Williams | ........... | G06Q 20/3829 |
| 2018/0165686 A1* | 6/2018 | Bacon | ................ | G06Q 20/4097 |
| 2018/0205725 A1* | 7/2018 | Cronkright | .......... | G06F 16/951 |
| 2018/0227131 A1* | 8/2018 | Ebrahimi | ............. | G06Q 20/065 |
| 2019/0020476 A1* | 1/2019 | Kats | ........................ | G06F 21/40 |
| 2019/0034610 A1* | 1/2019 | Miu | ....................... | G06F 21/32 |
| 2019/0034808 A1* | 1/2019 | Palanichamy | ......... | G06N 5/022 |
| 2019/0050921 A1* | 2/2019 | Ryner | ................. | H04L 63/0861 |
| 2019/0087892 A1* | 3/2019 | Pinski | .................... | G06Q 40/02 |
| 2019/0097812 A1* | 3/2019 | Toth | ....................... | G06F 21/602 |
| 2019/0207752 A1* | 7/2019 | Mandal | ................. | H04L 9/3242 |
| 2019/0243956 A1* | 8/2019 | Sheets | ..................... | G06F 21/32 |
| 2019/0333058 A1* | 10/2019 | Hong | ................. | G06Q 20/3829 |

OTHER PUBLICATIONS

Extended European Search Report dated Apr. 21, 2020 in European Application No. 20150130.1.

* cited by examiner

SYSTEMS AND METHODS FOR SECURELY VERIFYING A SUBSET OF PERSONALLY IDENTIFIABLE INFORMATION

TECHNICAL FIELD

Various embodiments of the present disclosure relate generally to verifying personally identifiable information (PII) of an individual and, more particularly, to systems and methods for securely verifying a subset of PII of a first user to a second user.

BACKGROUND

Personally identifiable information (PII) may include information to identify, contact, or locate an individual. For example, PII may include an individual's name, date of birth, home address, etc. Various agencies or organizations, such as financial institutions, medical institutions, educational institutions, etc., may collect and store such PII of an individual. Other organizations, such as vendors, merchants, or the like, may have a need or may be required to verify a subset of the PII of the individual (e.g., age, date of birth, or home address) to complete a transaction with the individual. For example, an alcohol vendor may be required to verify that a customer is older than twenty-one years of age (e.g., verify the customer's date of birth) in the sale of alcohol. Typically, this requires the customer to hand the vendor a form of identification, such as a driver's license, that includes not only the customer's date of birth, but also may include the customer's name and address. However, the customer may only want to share that the customer is older than twenty-one and may not want to share their date of birth, name, address, and/or any other PII.

There are many various scenarios in which a vendor, merchant, or other person/organization may need to verify an identity (e.g., a subset of PII) of an individual. However, the vendor or merchant may need to verify that the individual's identity method (e.g., driver's license, passport, etc.) is valid and correct. On the other hand, the individual may not wish to show the vendor or merchant the individual's driver's license which may contain more subsets of PII of the individual than is necessary to show the vendor or merchant. For example, the individual may not wish to hand over their driver's license (containing the individual's name, date of birth, and address) for the vendor or merchant to verify that the individual is older than twenty-one years of age. Further, current methods of verifying a subset of PII of an individual do not provide for securing the transaction via encryption means, such as a hash function to generate a blockchain entry.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, systems and methods are disclosed for securely verifying a subset of PII of a first user to a second user. Each of the examples disclosed herein may include one or more of the features described in connection with any of the other disclosed examples.

In one embodiment, a computer-implemented method for securely verifying a subset of personally identifiable information (PII) of a first user to a second user is disclosed. The method may include receiving a query request from the second user through a second user application to verify the subset of PII of the first user; prompting the first user, through a first user application, to authenticate the query request; in response to the first user authenticating the query request, processing the query request to identify, in a secured database, the subset of PII of the first user stored in the secured database, to generate an identified subset of PII; comparing the subset of PII to the identified subset of PII to determine if a condition is satisfied; based on the comparing, generating an answer to the query request; and transmitting the answer to the second user through the second user application.

In another embodiment, a computer system for securely verifying a subset of personally identifiable information (PII) of a first user to a second user is disclosed. The method may include a memory having processor-readable instructions stored therein; and at least one processor configured to access the memory and execute the processor-readable instructions, which when executed by the processor configures the processor to perform a plurality of functions, including functions for: receiving a query request from the second user through a second user application to verify the subset of PII of the first user; prompting the first user, through a first user application, to authenticate the query request; in response to the first user authenticating the query request, processing the query request to identify, in a secured database, the subset of PII of the first user stored in the secured database, to generate an identified subset of PII of the first user; generating an answer to the query request based on the identified subset of PII of the first user; and transmitting the answer to the second user through the second user application.

In yet another embodiment, a computer-implemented method for securely verifying a subset of personally identifiable information (PII) of a first user to a second user is disclosed. The method may include receiving a query request from the second user via a second user application of a second user device to verify the subset of PII of the first user, the query request including a question selectable by the second user in a list of predefined questions displayed via the second user application; validating an identity of the first user by at least one of the first user initiating a transaction via a transaction vehicle, or the first user scanning a matrix barcode in the first user application; prompting the first user through the first user application to authenticate the query request; receiving, from the first user through the first user application, authentication of the query request; in response to the first user authenticating the query request, processing the query request to identify, in a secured database, the subset of PII of the first user stored in the secured database, to generate an identified subset of PII; comparing the subset of PII to the identified subset of PII to determine if a condition is satisfied; based on the comparing, generating a binary answer to the query request; and displaying only the binary answer to the second user via the second user application such that the subset of PII is not displayed to the second user.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to verifying personally identifiable information (PII) of an individual and, more particularly, to systems and methods for securely verifying a subset of PII of a first user to a second user.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "computer system" generally encompasses any device or combination of devices, each device having at least one processor that executes instructions from a memory medium. Additionally, a computer system may be included as a part of another computer system.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In general, the present disclosure provides systems and methods for securely verifying a subset of personally identifiable information of a first user to a second user. For example, an answer to a query request to verify a subset of PII may be generated that does not include the PII requested to be verified. Systems and methods of the present disclosure may allow a financial institution (or other organization that may store PII of individuals) to provide an answer to the query request to a vendor or merchant to verify a subset of PII of an individual, while protecting the individual's privacy.

As used herein, "personally identifiable information (PII)" may include any information about an individual maintained by an agency or organization (e.g., institution 105), including any information that can be used to distinguish or trace an individual's identity, such as full name, picture (or image) of face, home address, email address, social security number, date and place of birth, driver's license number, vehicle registration plate number, credit card numbers, or biometric records (e.g., picture of face, fingerprints, or handwriting) and any other information that is linked or linkable to an individual, such as medical, educational, financial, and employment information. Further, as used herein, "subset of PII" may include any category of PII, such as full name, picture of face, home address, email address, social security number, date of birth, place of birth, driver's license number, vehicle registration plate number, credit card number(s), or biometric records or any category of medical, educational, financial, and employment information. As such, "subset of PII" may include a single category of PII or multiple categories of PII such that "subset of PII" may include a first subset of PII and may further include a second (third, fourth, fifth, etc.) subset of PII.

Figure 1:
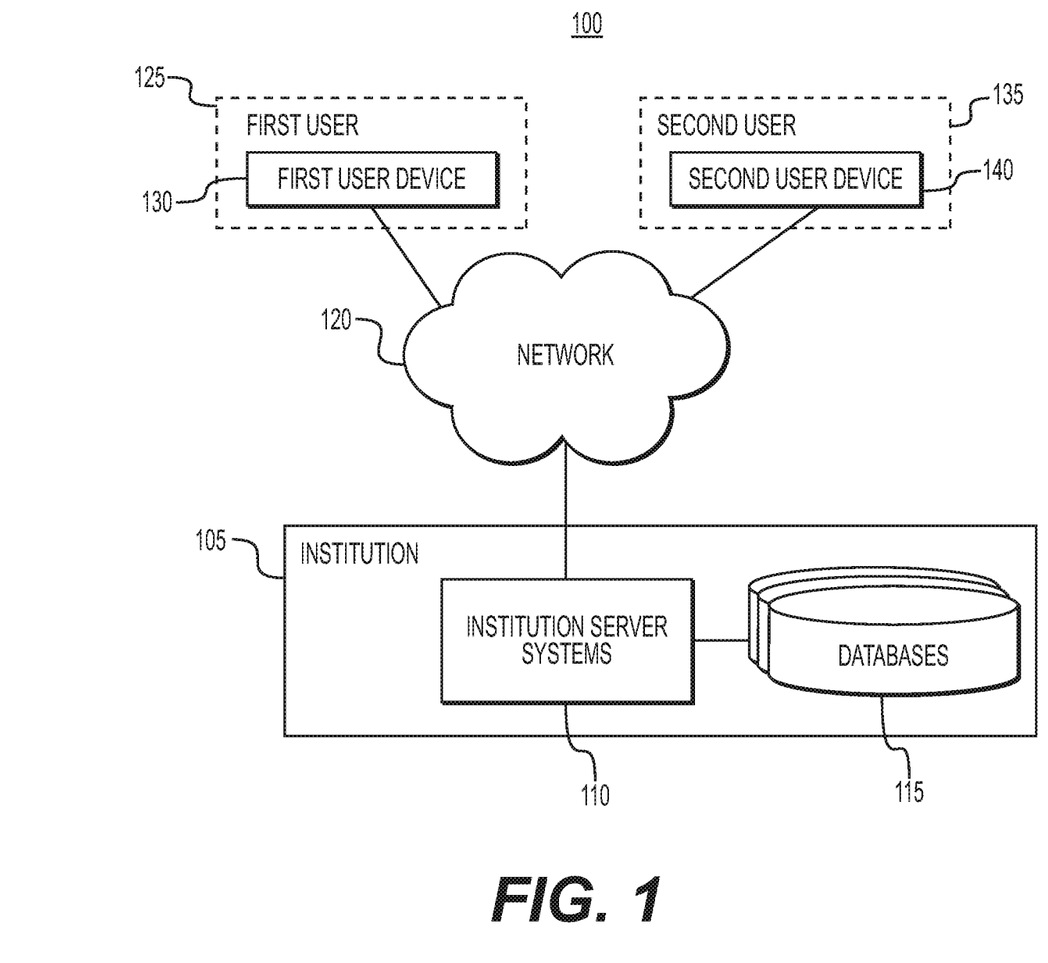
FIG. 1 depicts an exemplary system environment, according to one or more embodiments.

FIG. 1 depicts an exemplary environment of a system 100 for securely verifying personally identifiable information (PII) of a first user 125 to a second user 135, according to one or more embodiments of the present disclosure. As shown in FIG. 1, system 100 may include an institution 105 (e.g., a financial institution) having one or more institution server systems 110 (e.g., financial institution server systems) and one or more secured databases 115. The institution server systems 110 may include computing systems, such as system 500 described with respect to FIG. 5. As such, the institution server systems 110 may each include one or more processors and a memory for storing and executing applications or software modules of system 100. For example, institution server systems 110 may include one or more software modules to communicate with user devices through a network 120, such as the Internet. Further, the one or more processors may be configured to access the memory and execute processor-readable instructions, which when executed by the processor configures the processor to perform a plurality of functions of the system 100 for securely verifying PII of a first user 125 to a second user 135.

The one or more secured databases 115 may store PII of users, such as customers or clients of institution 105. Institution server systems 110 may be in communication with the one or more secured databases 115 such that institution server systems 110 may access, identify, and retrieve any subset of PII of any user from the one or more secured databases 115, as detailed further below. It is understood that institution 105 may include any agency or organization that collects, stores, and maintains PII, such as government agencies, financial organizations, medical organizations, educational organizations, or the like.

Users, such as first user 125 and second user 135, may communicate with institution server systems 110 through user devices, such as a first user device 130 and a second user device 140, respectively. First user 125 may include a customer or client of institution 105. In an exemplary embodiment, institution 105 may include a bank and first user 125 may include a customer or client having a credit card and/or banking account with the bank. As such, institution 105 may store PII of first user 125 in the one or more secured databases 115.

Second user 135 may include a vendor, merchant, health or medical professional, educational administrator, other financial institution professionals, or any other employees of institutions or organizations that may need to verify at least one subset of PII of the first user 125 with institution 105. For example, second user 135 may be an alcohol vendor and first user 125 may be a customer of the alcohol vendor. As such, second user 135 may desire or be required to verify at least one subset of PII of the first user 125, such as verifying that the customer is older than twenty-one years of age (e.g., verifying a date of birth of the first user 125). As detailed below, system 100 may allow second user 135 to verify the at least one subset of PII (e.g., date of birth) of first user 125 without revealing the at least one subset of PII (or any other subset of PII) of the first user 125 to the second user 135.

First user device 130 and second user device 140 may communicate with the institution server systems 110 through the network 120. First user device 130 may include a computing system or device, such as system 500 described with respect to FIG. 5. In an exemplary embodiment, first user device 130 may be a mobile device. As such, first user device 130 may include one or more processors and a memory for downloading, installing, and running mobile applications. First user device 130 may include a mobile application, such as a first user application provided by institution 105 via the one or more institution server systems 110. The first user application may include, for example, one or more software modules for communicating with institution server systems 110 through network 120. The first user application may further include one or more software modules for validating an identity of a first user 125 and for authenticating a query request from the second user 135, as further detailed below.

Figure 5:
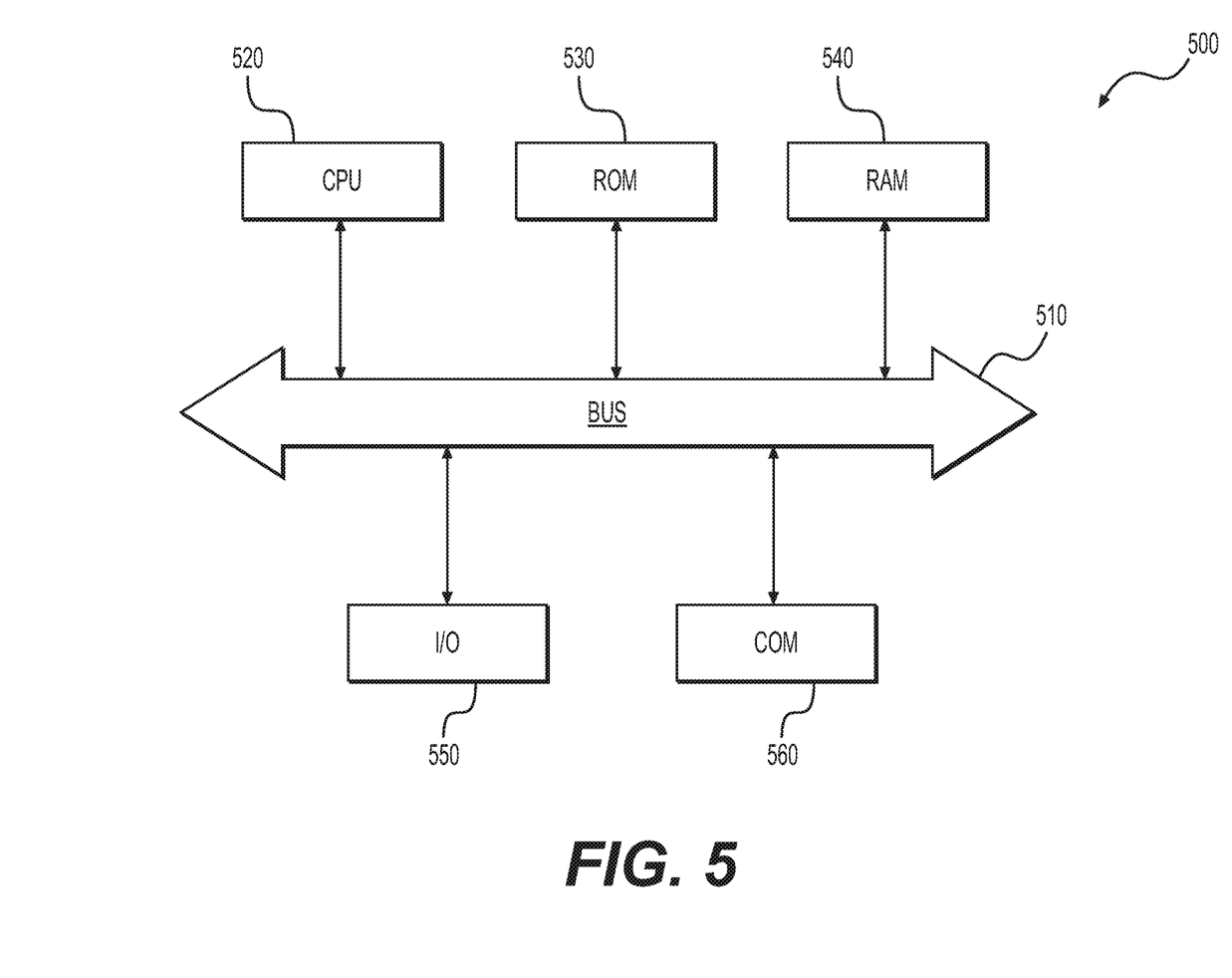
FIG. 5 depicts an example system that may execute techniques presented herein.

Second user device 140 may include a computing system or device, such as system 500 described with respect to FIG. 5. In one embodiment, second user device 140 may include a point of sale (POS) device. However, second user device 140 may include any type of computing device, such as a mobile computing device. As such, second user device 140 may include one or more processors and a memory for downloading, installing, and running applications or software modules. Second user device 140 may further be in communication with one or more transaction vehicles, or encoded information readers, such as a magnetic card reading device, a radio-frequency identification (RFID) reading device, a near-field communication (NFC) reading device, a bar code reading device, or the like. It is understood that the one or more transaction vehicles may encompass a single device, such that the magnetic card reading device, RFID reading device, NFC reading device, and bar code reading device are a part of a single device. Second user device 140 may include an application, such as a second user application provided by institution 105 via the institution server systems 110. As such, the second user application may include, for example, one or more software modules for communicating with institution server systems 110 through network 120. The second user application may further include one or more software modules for sending query requests to institution server systems 110 and one or more software modules for receiving generated answers from institution server systems 110 and displaying the generated answers through the second user application on second user device 140, as further detailed below.

Figure 2:
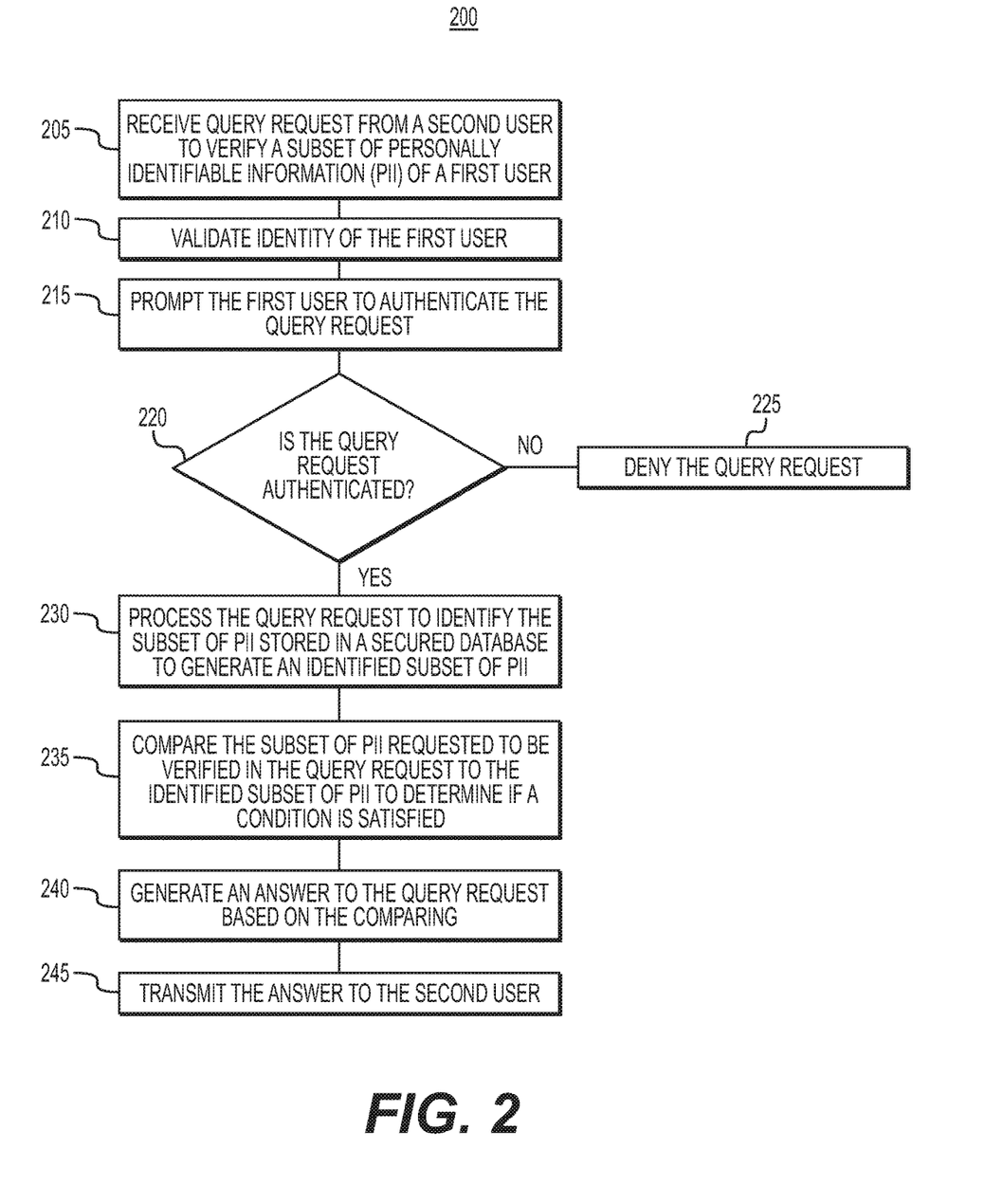
FIG. 2 depicts a flowchart of an exemplary process for verifying a subset of PII of a first user to a second user performed by the system environment of FIG. 1, according to one or more embodiments.

FIG. 2 depicts a flowchart of an exemplary process 200 for verifying a subset of PII of a first user 125 to a second user 135, according to one or more embodiments, and may be performed in the exemplary environment of FIG. 1. In an initial step 205, the institution server systems 110 may receive a query request from the second user 135 through the second user application on second user device 140 to verify the subset of PII of the first user 125. The query request may be a question selectable by the second user 135 in a list of predetermined questions displayed via the second user application on second user device 140. For example, one such question may include asking to verify if the first user 125 is older than twenty-one years of age. In some embodiments, the query request may include a predetermined code that may be entered in the second user application by the second user 135. For example, each predetermined question may include a unique numerical code that may be entered by the second user 135 to send the query request to the institution server systems 110.

In step 210, after receiving the query request, the institution server systems 110 may validate an identity of the first user 125. Validating an identity of the first user 125 may include the first user 125 initiating a transaction by using a transaction instrument or vehicle (e.g., a credit card). For example, the first user 125 may swipe or insert a credit card from institution 105 into a magnetic card reading device or NFC reading device associated with second user device 140. First user 125 may also initiate a transaction by using a digital wallet application on first user device 130, such as Apple Pay®. First user 125 may further initiate a transaction to validate an identity of first user 125 by scanning a matrix barcode within the first user application on first user device 130. For example, the first user application may include a QR Code® that may be scanned by a barcode reading device associated with second user device 140. Validating an identity of first user 125 may verify that first user 125 is a current and valid client or customer of institution 105 such that institution 105 has stored PII of first user 125 in the one or more secured databases 115. It is understood that the identity of the first user 125 may be validated by any conventional validation means.

In step 215, when the identity of first user 125 is validated, the institution server systems 110 may transmit a prompt to first user 125 through the first user application to authenticate the query request to ensure the query request is a valid request. The prompt to authenticate the query request may include displaying a message through the first user application for first user 125 to authenticate the query request. Authenticating the query request may include authenticating via the first user device 130, for example, by entry of a pin or password, by answering a predetermined security question, or by a biometric method, such as facial recognition or fingerprint recognition. For example, first user 125 may authenticate the query request by opening the prompt through the first user application and using facial recognition, such as Apple Inc.'s Face ID®, on first user device 130.

In step 220, institution server systems 110 may determine whether the query request has been authenticated. For example, if first user 125 cancels, denies, or does not answer (within a predetermined amount of time) the prompt through the first user application such that first user 125 does not authenticate the query request (step 220: NO), institution server systems 110 may deny the query request (step 225). In step 225, denying the query request may include transmitting a message to the second user 135 through the second user application on second user device 140 informing the second user 135 that the query request has been denied. If first user 125 authenticates the query request through the first user application such that the authentication is accepted (step 220: YES), institution server systems 110 may process the query request to identify the subset of PII stored in the secured databases 115 to generate an identified subset of PII (step 230).

In step 230, processing the query request may include the institution server systems 110 determining which subset of PII is needed to answer the query request and identifying the subset of PII in the secured databases 115 to generate an identified subset of PII. For example, if the query request includes verifying that a customer is older than twenty-one years of age, institution server systems 110 may determine that the subset of PII needed to answer the query request is a date of birth of the first user 125.

In step 235, the institution server systems 110 may compare the subset of PII requested to be verified in the query request to the identified subset of PII to determine if a condition is satisfied. For example, institution server systems 110 may compare the date of birth of the first user 125 requested to be verified in the query request to the identified date of birth of the first user 125 to determine if the first user 125 is older than twenty-one years of age. Institution server systems 110 may, for example, compare the identified date of birth of first user 125 to the current date on which the query request is received to determine if the first user 125 is older than twenty-one years of age. In another example, institution server systems 110 may compare a requested address of first user 125 to be verified with an identified address of first user 125 to determine if the requested address of first user 125 is correct.

In step 240, based on the comparing, the institution server systems 110 may generate an answer to the query request. In some embodiments, the answer may be a binary answer. For example, the answer may be a "yes" or a "no" or any other type of binary answer or form of "yes" or "no." If the condition is satisfied in step 235, institution server systems 110 may generate a "yes" answer. If the condition is not satisfied in step 235, institution server systems 110 may generate a "no" answer. In some embodiments, generating an answer to the query request may include generating a response, the response not containing the subset of PII (or any other subset of PII) of the first user 125.

In step 245, the institution server systems 110 may transmit the generated answer (or generated response) to the second user 135 through the second user application. For example, the generated answer to the query request may be displayed through the second user application on second user device 140. When the second user 135 is a vendor, for example, the generated answer may be displayed via the POS device. In some embodiments, the institution server systems 110 may transmit only the generated answer to the second user 135 through the second user application. For example, the institution server systems 110 may transmit only the generated answer to the second user 135 without transmitting the subset of PII of the first user 125. For example, only the "yes" or only the "no" answer may be displayed via the second user application such that the date of birth (or any other subset of PII) of the first user 125 is not transmitted and/or displayed to the second user 135.

In some embodiments, the query request and the generated answer to the query request may be stored in a private or public blockchain to become immutable. As such, the query request may be sent in a blockchain entry for securely sending the query request to the institutions server systems 110. Likewise, the generated answer to the query request may be transmitted in the blockchain entry for securely sending the generated answer to the second user 135. For example, a hash function, or hashing algorithm, may be used to encrypt the query request into a series of numbers and letters that does not resemble the original data of the query request (e.g., does not resemble the question and/or numerical code for the query request).

In some embodiments, the blockchain entry may include, for example, a time of the transaction, the identity of the first user 125 (e.g., a name of the first user 125), metadata of the first user application and first user device 130, the identity of the second user 135 (e.g., a name of the second user 135), metadata of the second user application and second user device 140, a name of the institution 105, and metadata of the authentication. The metadata of the authentication may include, for example, the authentication method used (e.g., entry of pin or password, answering predetermined security question, or biometric method) and a result of the authentication (e.g., the query request is authenticated or not authenticated).

In some embodiments, when the query request is received as a blockchain entry (e.g., the query request has been encrypted via a hashing algorithm), processing the query request may further include decrypting the encrypted query request. To decrypt the encrypted query request, the institution server systems 110 may compare the hash result (e.g., the series numbers and letters) in a key-value dictionary to determine the original query request (e.g., the predetermined numerical code of the query request). As such, the numerical code for each query request may include a key-value for a corresponding hash result. For example, if the numerical code for the query request to verify the first user 125 is older than 21 years of age is defined as "400," the result of the hashing function may be a string of numbers and letters, for example, "18d8042386b79e2c279fd162df0205c8." The string may be sent to the institution server systems 110 and the institution server systems 110 may use the key-value dictionary to compare the string to determine the numerical code of the query request corresponding to the string. Thus, the query request may be securely sent to the institution server systems 110.

Figure 3:
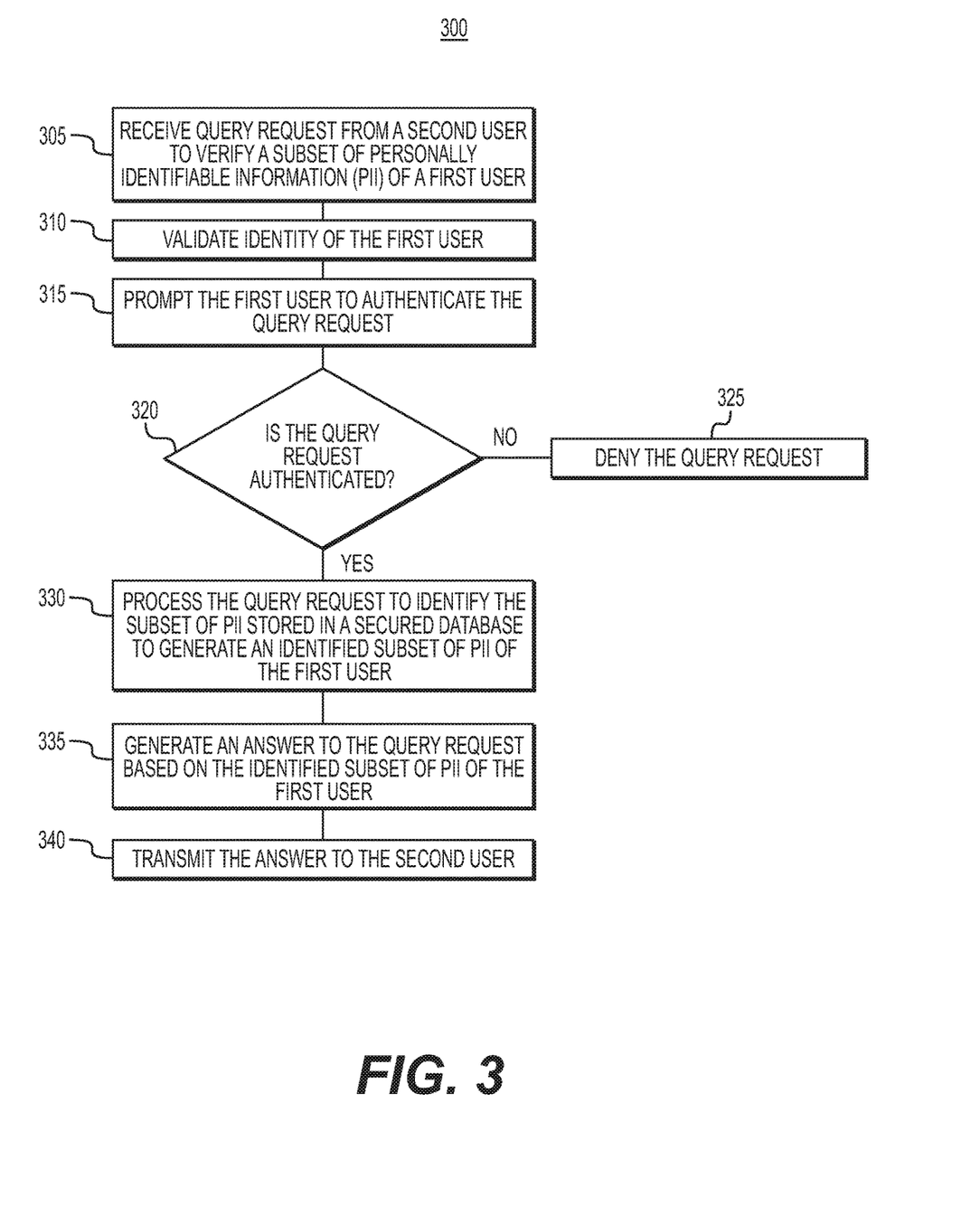
FIG. 3 depicts a flowchart of an exemplary process for verifying a subset of PII of a first user to a second user performed by the system environment of FIG. 1, according to one or more embodiments.

FIG. 3 depicts a flowchart of an exemplary process 300 for verifying a subset of PII of a first user 125 to a second user 135, according to one or more embodiments, and may be performed in the exemplary environment of FIG. 1. In an initial step 305, the institution server systems 110 may receive a query request from the second user 135 through a second user application on second user device 140 to verify the subset of PII of the first user 125. The query request may be a question selectable by the second user 135 in a list of predetermined questions displayed via the second user application on second user device 140. In some embodiments, the query request may include a predetermined code that may be entered in the second user application by the second user 135. For example, each predetermined question may include a unique numerical code that may be entered by the second user 135 to send the query request to the institution server systems 110.

In step 310, after receiving the query request, the institution server systems 110 may validate an identity of the first user 125. Validating an identity of the first user 125 may include the first user 125 initiating a transaction by using a transaction instrument or vehicle (e.g., a credit card). For example, the first user 125 may swipe or insert a credit card from institution 105 into a magnetic card reading device or NFC reading device associated with second user device 140. First user 125 may also initiate a transaction by using a digital wallet application on first user device 130, such as Apple Pay®. First user 125 may further initiate a transaction to validate an identity of first user 125 by scanning a matrix barcode within the first user application on first user device 130. For example, the first user application may include a QR Code® that may be scanned by a barcode reader associated with second user device 140. Validating an identity of first user 125 may verify that first user 125 is a current and valid client or customer of institution 105 such that institution 105 has stored PII of first user 125 in the one or more secured databases 115. It is understood that the identity of the first user 125 may be validated by any conventional validation means.

In step 315, when the identity of first user 125 is validated, the institution server systems 110 may transmit a prompt to first user 125 through the first user application to authenticate the query request to ensure the query request is a valid request. The prompt to authenticate the query request may include displaying a message through the first user application for first user 125 to authenticate the query request. Authenticating the query request may include authenticating via the first user device 130, for example, by entry of a pin or password, by answering a predetermined security question, or by a biometric method, such as facial recognition or fingerprint recognition. For example, first user 125 may authenticate the query request by opening the prompt through first user application and using facial recognition, such as Apple Inc.'s Face ID®, on first user device 130.

In step 320, institution server systems 110 may determine whether the query request has been authenticated. For example, if first user 125 cancels, denies, or does not answer (within a predetermined amount of time) the prompt through the first user application such that first user 125 does not authenticate the query request (step 320: NO), institution server systems 110 may deny the query request (step 325). In step 325, denying the query request may include transmitting a message to the second user 135 through the second user application on second user device 140 informing the second user 135 that the query request has been denied. If first user 125 authenticates the query request through the first user application (step 320: YES), institution server systems 110 may process the query request to identify the subset of PII stored in the secured databases 115 to generate an identified subset of PII (step 330).

In step 330, processing the query request may include the institution server systems 110 determining which subset of PII is needed to answer the query request and identifying the subset of PII in the secured databases 115 to generate an identified subset of PII. For example, if the query request includes verifying that a customer is older than twenty-one years of age, institution server systems 110 may determine that the subset of PII needed to answer the query request is a date of birth of the first user 125.

In step 335, the institution server systems 110 may generate an answer to the query request. In some embodiments, the generated answer may be the identified subset of PII of the first user 125. For example, the generated answer may be the date of birth of the first user 125. In some embodiments, the generated answer may be only the identified subset of PII of the first user 125 such that the generated answer does not include any other subset of PII of the first user 125. In other embodiments, the answer may be a binary answer. For example, the answer may be a "yes" or a "no" or any other type of binary answer or form of "yes" or "no."

In step 340, the institution server systems 110 may transmit the generated answer to the second user 135 through the second user application. For example, the generated answer to the query request may be displayed through the second user application on second user device 140. When the second user 135 is a vendor, for example, the generated answer may be displayed via the POS device. In some embodiments, the institution server systems 110 may transmit only the generated answer to the second user 135 through the second user application. For example, the institution server systems 110 may transmit only the identified subset of PII to the second user 135 without transmitting any other subset of PII of the first user 125. For example, only the date of birth of the first user 125 may be displayed via the second user application such that any other subset of PII (e.g., name, address, etc.) of the first user 125 is not transmitted and/or displayed to the second user 135.

In some embodiments, the query request and the generated answer to the query request may be stored in a private or public blockchain to become immutable. As such, the query request may be sent in a blockchain entry for securely sending the query request to the institutions server systems 110. Likewise, the generated answer to the query request may be transmitted in the blockchain entry for securely sending the generated answer to the second user 135. For example, a hash function, or hashing algorithm, may be used to encrypt the query request into a series of numbers and letters that does not resemble the original data of the query request (e.g., does not resemble the question and/or numerical code for the query request).

In some embodiments, the blockchain entry may include, for example, a time of the transaction, the identity of the first user 125 (e.g., a name of the first user 125), metadata of the first user application and first user device 130, the identity of the second user 135 (e.g., a name of the second user 135), metadata of the second user application and second user device 140, a name of the institution 105, and metadata of the authentication. The metadata of the authentication may include, for example, the authentication method used (e.g., entry of pin or password, answering predetermined security question, or biometric method) and a result of the authentication (e.g., the query request is authenticated or not authenticated).

In some embodiments, when the query request is received as a blockchain entry (e.g., the query request has been encrypted via a hashing algorithm), processing the query request may further include decrypting the encrypted query request. To decrypt the encrypted query request, the institution server systems 110 may compare the hash result (e.g., the series numbers and letters) in a key-value dictionary to determine the original query request (e.g., the predetermined numerical code of the query request). As such, the numerical code for each query request may include a key-value for a corresponding hash result. For example, if the numerical code for the query request to verify the first user 125 is older than 21 years of age is defined as "400," the result of the hashing function may be a string of numbers and letters, for example, "18d8042386b79e2c279fd162df0205c8." The string may be sent to the institution server systems 110 and the institution server systems 110 may use the key-value dictionary to compare the string to determine the numerical code of the query request corresponding to the string. Thus, the query request may be securely sent to the institution server systems 110.

Figure 4:
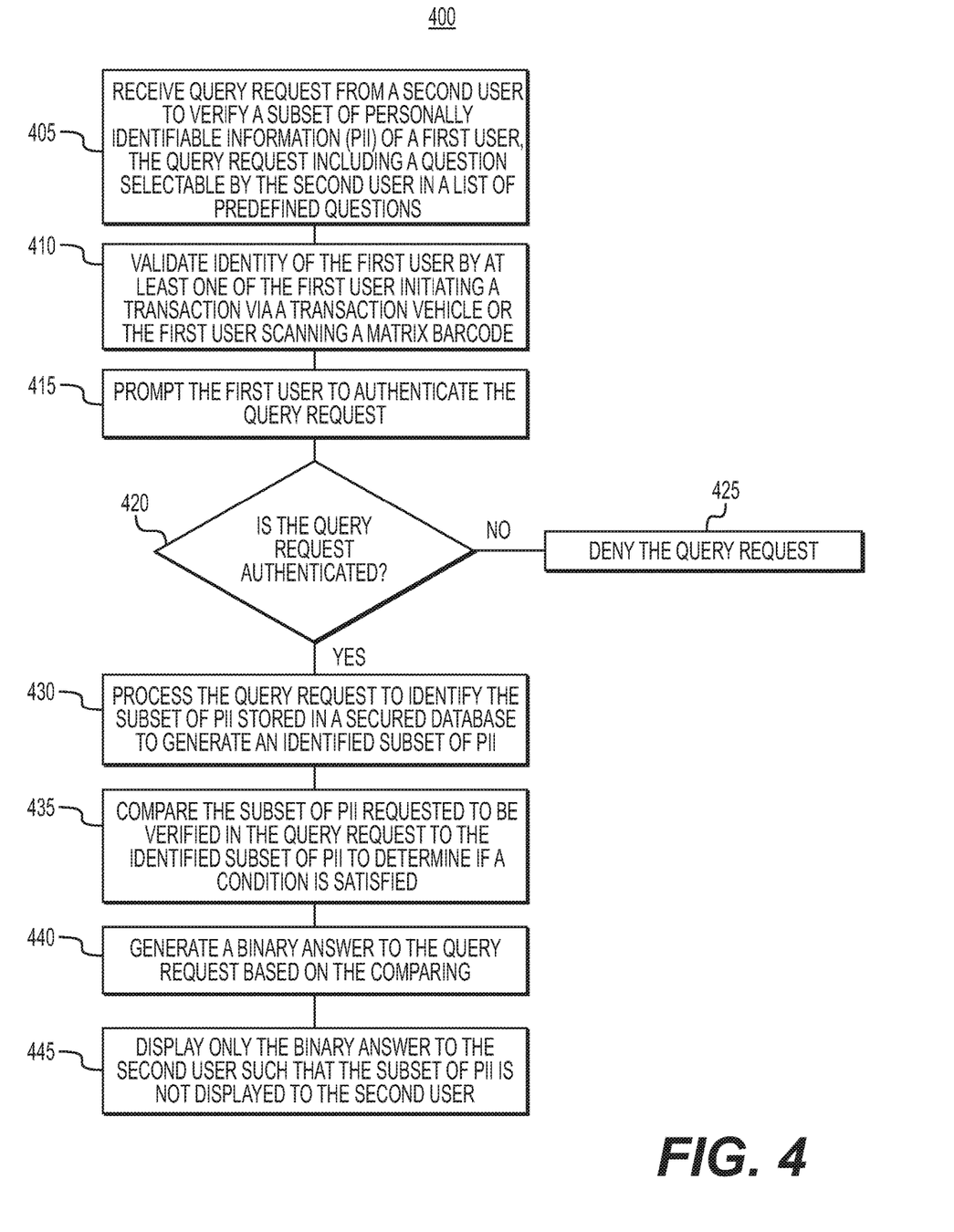
FIG. 4 depicts a flowchart of an exemplary process for verifying a subset of PII of a first user to a second user performed by the system environment of FIG. 1, according to one or more embodiments.

FIG. 4 depicts a flowchart of an exemplary process 400 for verifying a subset of PII of a first user 125 to a second user 135, according to one or more embodiments, and may be performed in the exemplary environment of FIG. 1. In an initial step 405, the institution server systems 110 may receive a query request from the second user 135 through a second user application on second user device 140 to verify the subset of PII of the first user 125, where the query request may be a question selectable by the second user 135 in a list of predetermined questions displayed via the second user application on second user device 140.

In step 410, after receiving the query request, the institution server systems 110 may validate an identity of the first user 125 by at least one of the first user 125 initiating a transaction via a transaction vehicle (e.g., by using a credit card) or the first user 125 scanning a matrix barcode within a first user application of first device 130 via a matrix barcode reading device associated with second user device 140.

In step 415, when the identity of first user 125 is validated, the institution server systems 110 may transmit a prompt to first user 125 through the first user application to authenticate the query request to ensure the query request is a valid request. In step 420, institution server systems 110 may determine whether the query request has been authenticated. For example, if first user 125 cancels, denies, or does not answer (within a predetermined amount of time) the prompt through the first user application such that first user 125 does not authenticate the query request (step 420: NO), institution server systems 110 may deny the query request (step 425). In response to the first user first user 125 authenticating the query request (step 420: YES), institution server systems 110 may process the query request to identify, in the secured databases 115, the subset of PII stored in the secured databases 115 (step 430). In step 430, processing the query request may include the institution server systems 110 determining which subset of PII is needed to answer the query request and identifying the subset of PII in the secured databases 115 to generate an identified subset of PII.

In step 435, the institution server systems 110 may compare the subset of PII requested to be verified in the query request to the identified subset of PII to determine if a condition is satisfied. In step 440, based on the comparing, the institution server systems 110 may generate a binary answer to the query request. For example, the binary answer may be a "yes" or a "no" answer or any other type of binary answer or form of "yes" or "no." If the condition is satisfied in step 435, institution server systems 110 may generate a "yes" answer. If the condition is not satisfied in step 235, institution server systems 110 may generate a "no" answer. In step 445, the institution server systems 110 may display only the binary answer to the second user 135 via the second user application such that the subset of PII is not displayed to the second user 135.

FIG. 5 depicts an example system 500 that may execute techniques presented herein. FIG. 5 is a simplified functional block diagram of a computer that may be configured to execute techniques described herein, according to exemplary embodiments of the present disclosure. Specifically, the computer (or "platform" as it may not a be a single physical computer infrastructure) may include a data communication interface 560 for packet data communication. The platform also may include a central processing unit ("CPU") 520, in the form of one or more processors, for executing program instructions. The platform may include an internal communication bus 510, and the platform also may include a program storage and/or a data storage for various data files to be processed and/or communicated by the platform such as ROM 530 and RAM 540, although the system 500 may receive programming and data via network communications. The system 500 also may include input and output ports 550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for securely verifying a subset of personally identifiable information (PII) of a first user to a second user, the method comprising:
   receiving, by a processor, a transaction initiation message from a second user device through an electronic network, the transaction initiation message comprising transaction instrument data of the first user;
   receiving, by the processor, from a second user application on the second user device, through the electronic network, a query request for verification of a subset of PII of the first user, the query request comprising a hash corresponding to a predetermined numerical code;
   comparing, by the processor, the hash of the query request to a key-value dictionary of hashes that each correspond to a respective predetermined numerical code;
   based on the comparing of the hash to the key-value dictionary, determining, by the processor, the predetermined numerical code corresponding to the hash of the query request;
   determining, by the processor, the subset of PII requested for verification based on the predetermined numerical code;
   based on the received transaction instrument data, validating, by the processor, an identity of the first user;
   transmitting, by the processor, a prompt to a first user application on a first user device through the electronic network prompting the first user to authenticate the query request;
   receiving, by the processor, authentication of the query request from the first user application on the first user device;
   in response to receiving authentication of the query request, identifying, by the processor, the subset of PII of the first user in a secured database;
   verifying the subset of PII by comparing, by the processor, the determined subset of PII requested for verification to the identified subset of PII;
   based on the comparing of the subset of PII requested for verification to the identified subset of PII, determining, by the processor, whether a condition of the query request is satisfied;
   generating, by the processor, an answer to the query request from a binary set of answer options, the answer being based on the determination of the condition of the query request being satisfied; and
   transmitting, by the processor, the answer to the second user application on the second user device through the electronic network for displaying the answer on the second user device.

2. The method of claim 1, wherein the transaction instrument data of the first user includes at least one of: a transaction vehicle of the first user from the first user device or from the second user device; or a matrix barcode from the first user application.

3. The method of claim 1, wherein the predetermined numerical code is one of a plurality of predetermined numerical codes, and the method further comprises:
   transmitting, by the processor, a list of predetermined numerical codes to the second user application on the second user device through the electronic network prior to receiving the query request, each predetermined numerical code in the list corresponding to a different query request, wherein the hash corresponds to the predetermined numerical code from the a list of predetermined numerical codes.

4. The method of claim 1, wherein the receiving authentication of the query request includes receiving, by the processor, confirmation of a correct entry of: a password of the first user from the first user application, facial recognition of the first user from the first user application, or fingerprint recognition of the first user from the first user application.

5. The method of claim 1, wherein the transmitting, by the processor, the answer to the second user application on the second user device includes transmitting, by the processor, only the answer to the second user application on the second user device.

6. The method of claim 1, wherein the generating, by the processor, the answer to the query request from the binary set of answer options includes generating a response, the response not containing the subset of PII of the first user, the method further including: transmitting, by the processor, the response to the second user application on the second user device through the electronic network for displaying the response on the second user device.

7. The method of claim 1, further comprising: storing, by the processor, the query request and the answer in a blockchain entry.

8. The method of claim 7, wherein the blockchain entry includes at least one of: a time of transaction, the identity of the first user, metadata of the first user application and the first user device, an identity of the second user, metadata of the second user application and the second user device, or metadata of the authentication.

9. A computer system for securely verifying a subset of personally identifiable information (PII) of a first user to a second user, the computer system comprising:
   a memory having processor-readable instructions stored therein; and
   at least one processor configured to access the memory and execute the processor-readable instructions, which when executed by the at least one processor configures the at least one processor to perform a plurality of functions, including functions for:

15 receiving a transaction initiation message from a second user device through an electronic network, the transaction initiation message comprising transaction instrument data of the first user;

receiving, from a second user application on the second user device through the electronic network, a query request for verification of a subset of PII of the first user, the query request comprising a hash corresponding to a predetermined numerical code;

comparing the hash of the query request to a key-value dictionary of hashes that each correspond to a respective predetermined numerical code;

based on the comparing of the hash to the key-value dictionary, determining the predetermined numerical code corresponding to the hash of the query request;

determining the subset of PII requested for verification based on the predetermined numerical code;

based on the received transaction instrument data, validating an identity of the first user;

transmitting a prompt to a first user application on a first user device through the electronic network prompting the first user to authenticate the query request;

receiving authentication of the query request from the first user application on the first user device:

in response to receiving authentication of the query request, identifying the subset of PII of the first user in a secured database;

verifying the subset of PII by comparing the determined subset of PII requested for verification to the identified subset of PII;

based on the comparing of the subset of PII requested for verification to the identified subset of PII, determining whether a condition of the query request is satisfied;

generating an answer to the query request from a binary set of answer options, the answer being based on the determination of the condition of the query request being satisfied; and transmitting the answer to the second user application on the second user device through the electronic network for displaying the answer on the second user device.

10. The system of claim 9, wherein the transaction instrument data of the first user includes at least one of: a transaction vehicle of the first user from the first user device or from the second user device; or a matrix barcode from the first user application.

11. The system of claim 9, wherein the predetermined numerical code is one of a plurality of predetermined numerical codes, and the plurality of functions further comprise instructions for: transmitting a list of predetermined numerical codes to the second user application on the second user device through the electronic network prior to receiving the query request, each predetermined numerical code in the list corresponding to a different query request, wherein the hash corresponds to the predetermined numerical code from a the list of predetermined numerical codes.

12. The system of claim 9, wherein the receiving authentication of the query request includes receiving confirmation of a correct entry of: a password of the first user from the first user application, facial recognition of the first user from the first user application, or fingerprint recognition of the first user from the first user application.

13. The system of claim 9, wherein the transmitting the answer to the second user application on the second user device includes transmitting only the answer to the second user application on the second user device.

16

14. The system of claim 9, further comprising instructions for: storing, the query request and the answer in a blockchain entry.

15. The system of claim 14, wherein the blockchain entry includes at least one of: a time of transaction, the identity of the first user, metadata of the first user application and the first user device, an identity of the second user, metadata of the second user application and the second user device, or metadata of the authentication.

16. A computer-implemented method for securely verifying a subset of personally identifiable information (PII) of a first user to a second user, the method comprising:

receiving, by a processor, a transaction initiation message from a second user device through an electronic network, the transaction initiation message comprising transaction instrument data of the first user;

transmitting, by the processor, a list of predetermined numerical codes to a second user application on the second user device through an electronic network, wherein each predetermined numerical code in the list corresponds to a different query request;

receiving, by the processor, from the second user application on the second user device, through an electronic network, a query request for verification of a subset of PII of the first user, the query request comprising a hash corresponding to a predetermined numerical code of the list;

comparing, by the processor, the hash of the query request to a key-value dictionary of hashes that each correspond to a respective predetermined numerical code;

based on the comparing of the hash to the key-value dictionary, determining, by the processor, the predetermined numerical code corresponding to the hash of the query request;

determining, by the processor, the subset of PII requested for verification based on the predetermined numerical code;

based on the received transaction instrument data, validating, by the processor, an identity of the first user;

transmitting, by the processor, a prompt to a first user application on a first user device through the electronic network prompting the first user to authenticate the query request;

receiving, by the processor, authentication of the query request from the first user application on the first user device by receiving, by the processor, confirmation of a correct entry of:

a password of the first user from the first user application, facial recognition of the first user from the first user application, or fingerprint recognition of the first user from the first user application;

in response to receiving authentication of the query request from the first user application on the first user device, identifying, by the processor, the subset of PII of the first user in a secured database;

verifying the subset of PII by comparing, by the processor, the determined subset of PII requested for verification to the identified subset of PII;

based on the comparing of the subset of PII requested for verification to the identified subset of PII, determining, by the processor, whether a condition of the query request is satisfied;

generating, by the processor, an answer to the query request from a binary set of answer options, the answer being based on the determination of the condition of the query request being satisfied; and transmitting, by the processor, only the answer to the second user application on the second user device through the electronic network for displaying only the answer on the second user device.

17. The method of claim 16, further comprising: storing, by the processor, the query request and the answer in a blockchain entry.

18. The method of claim 17, wherein the blockchain entry includes at least one of: a time of transaction, the identity of the first user, metadata of the first user application and the first user device, an identity of the second user, metadata of the second user application and the second user device, or metadata of the authentication.

\* \* \* \* \*